(12) United States Patent
Toyoura

(10) Patent No.: US 11,341,615 B2
(45) Date of Patent: May 24, 2022

(54) IMAGE PROCESSING APPARATUS, IMAGE PROCESSING METHOD, AND MOVING BODY TO REMOVE NOISE IN A DISTANCE IMAGE

(71) Applicant: SONY CORPORATION, Tokyo (JP)

(72) Inventor: Masataka Toyoura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 16/640,855

(22) PCT Filed: Aug. 21, 2018

(86) PCT No.: PCT/JP2018/030726
§ 371 (c)(1),
(2) Date: Feb. 21, 2020

(87) PCT Pub. No.: WO2019/044571
PCT Pub. Date: Mar. 7, 2019

(65) Prior Publication Data
US 2021/0183016 A1 Jun. 17, 2021

(30) Foreign Application Priority Data
Sep. 1, 2017 (JP) .............................. JP2017-168592

(51) Int. Cl.
*G06K 9/40* (2006.01)
*G06T 5/00* (2006.01)
(Continued)

(52) U.S. Cl.
CPC ............ *G06T 5/002* (2013.01); *G01S 7/4808* (2013.01); *G01S 17/894* (2020.01); *G06T 5/20* (2013.01);
(Continued)

(58) Field of Classification Search
CPC ........... G06T 5/002; G06T 7/521; G06T 5/20; G06T 2207/10028; G06T 2207/20028;
(Continued)

(56) References Cited

U.S. PATENT DOCUMENTS 5,966,678 A * 10/1999 Lam ...................... G01S 7/4802
356/73
9,580,014 B2 * 2/2017 Lucas .................... G06V 20/56
(Continued)

FOREIGN PATENT DOCUMENTS

CN 105825494 A * 8/2016
CN 106791770 A * 5/2017
(Continued)

OTHER PUBLICATIONS

Human Detection Using Image Fusion of Thermal and Visible Image with New Joint Bilateral Filter, Eun-Jin Choi et al., IEEE, Feb. 10, 2011, pp. 1-9 (Year: 2011).*
(Continued)

*Primary Examiner* — Jayesh A Patel
(74) *Attorney, Agent, or Firm* — Chip Law Group

(57) ABSTRACT

Provided are an image processing apparatus, an image processing method, and a moving body that enable removal of noise in distance images. A distance image having a pixel value corresponding to a distance to an object and an intensity image having a pixel value corresponding to the received light intensity of light reflected from the object that are taken at the same angle are acquired, and a pixel value of a pixel in the distance image that corresponds to a pixel having a pixel value smaller than a predetermined threshold in the intensity image is converted into a no-distance pixel. Noise in the distance image is removed in this way.

13 Claims, 9 Drawing Sheets

(51) Int. Cl.
*G06T 7/521* (2017.01)
*G01S 17/894* (2020.01)
*G01S 7/48* (2006.01)
*G06T 5/20* (2006.01)

(52) U.S. Cl.
CPC .... *G06T 7/521* (2017.01); *G06T 2207/10028* (2013.01); *G06T 2207/20028* (2013.01); *G06T 2207/20072* (2013.01)

(58) Field of Classification Search
CPC . G06T 2207/20072; G06T 2207/10048; G06T 2207/30252; G06T 5/50; G06T 7/00; G01S 17/894; G01S 7/4808; G01S 17/89
See application file for complete search history.

(56) References Cited

U.S. PATENT DOCUMENTS

| | | | |
|---|---|---|---|
| 9,805,294 B2* | 10/2017 | Liu | G06K 9/6215 |
| 10,032,283 B2* | 7/2018 | Baltsen | G06T 5/002 |
| 10,269,104 B2* | 4/2019 | Hannuksela | G01S 17/36 |
| 10,453,249 B2* | 10/2019 | Smirnov | G06T 5/001 |
| 2005/0195383 A1* | 9/2005 | Breed | G01S 7/417 |
| | | | 356/4.01 |
| 2006/0025888 A1 | 2/2006 | Gutmann et al. | |
| 2007/0122033 A1* | 5/2007 | Hu | G06T 7/136 |
| | | | 382/171 |
| 2008/0204579 A1* | 8/2008 | Masuda | G06T 5/50 |
| | | | 348/254 |
| 2009/0228204 A1* | 9/2009 | Zavoli | G01S 19/49 |
| | | | 701/532 |
| 2013/0342694 A1* | 12/2013 | Friedhoff | G06V 20/56 |
| | | | 348/148 |
| 2014/0379254 A1* | 12/2014 | Miksa | G01C 21/3811 |
| | | | 701/450 |
| 2015/0023563 A1* | 1/2015 | Koppal | G06T 7/30 |
| | | | 382/106 |
| 2015/0092017 A1* | 4/2015 | Kang | G06T 5/002 |
| | | | 348/46 |
| 2015/0235351 A1* | 8/2015 | Mirbach | G06T 5/002 |
| | | | 382/154 |
| 2015/0302570 A1* | 10/2015 | Shirakyan | G01S 17/08 |
| | | | 348/46 |
| 2016/0364844 A1 | 12/2016 | Ivanchenko | |
| 2018/0211398 A1* | 7/2018 | Schmidt | G01S 17/42 |
| 2018/0232859 A1* | 8/2018 | Siddiqui | G06T 5/50 |
| 2019/0113606 A1* | 4/2019 | Mathy | H04N 13/254 |
| 2020/0039437 A1* | 2/2020 | Ishida | G06T 1/00 |

FOREIGN PATENT DOCUMENTS

| | | | | |
|---|---|---|---|---|
| JP | 2006-011880 A | | 1/2006 | |
| JP | 2010-165183 A | | 7/2010 | |
| JP | 2013-187645 A | | 9/2013 | |
| JP | 2014056494 A | * | 3/2014 | |
| JP | 2014-191595 A | | 10/2014 | |
| JP | 2015-147481 A | | 8/2015 | |
| JP | 2016509208 A | * | 3/2016 | |
| KR | 20140106870 A | * | 9/2014 | |
| KR | 10-2016-0145465 A | | 12/2016 | |
| WO | WO-2014123583 A1 | * | 8/2014 | G06T 5/002 |
| WO | WO-2014126613 A1 | * | 8/2014 | G06T 7/174 |
| WO | 2014/157435 A1 | | 10/2014 | |
| WO | 2016/208215 A1 | | 12/2016 | |
| WO | WO-2016208215 A1 | * | 12/2016 | G01S 17/10 |

OTHER PUBLICATIONS

A New Multi-lateral Filter for Real-Time Depth Enhancement, Frederic Garcia et al., IEEE, 978-1-4577-0845-9, 2011, pp. 42-47 (Year: 2011).*
Contrast Enhancement, Denoising and Fusion in Dark Video, Nils Jungenfelt et al., Chalmers, 2012, pp. 1-38 (Year: 2012).*
Guided Inpainting and Filtering for Kinect Depth Maps, Junyi Liu et al., IEEE, 978-4-9906441-0-9, 2012, pp. 2055-2058 (Year: 2012).*
High quality depth map estimation by kinect upsampling and hole filling using RGB features and mutual information, Nidhi Chahal et al., Inspec, Dec. 2013, pp. 1-14 (Year: 2013).*
International Search Report and Written Opinion of PCT Application No. PCT/JP2018/030726, dated Oct. 23, 2018, 10 pages of ISRWO.

* cited by examiner

IMAGE PROCESSING APPARATUS, IMAGE PROCESSING METHOD, AND MOVING BODY TO REMOVE NOISE IN A DISTANCE IMAGE

CROSS REFERENCE TO RELATED APPLICATIONS

This application is a U.S. National Phase of International Patent Application No. PCT/JP2018/030726 filed on Aug. 21, 2018, which claims priority benefit of Japanese Patent Application No. JP 2017-168592 filed in the Japan Patent Office on Sep. 1, 2017. Each of the above-referenced applications is hereby incorporated herein by reference in its entirety.

TECHNICAL FIELD

The present disclosure relates to an image processing apparatus, an image processing method, a program, and a moving body, and in particular, to an image processing apparatus, an image processing method, a program, and a moving body that can reduce distance image errors.

BACKGROUND ART

There is a growing need for distance images having pixel values corresponding to distances to objects. A distance image is obtained by obtaining distances to objects in pixel units on the basis of round-trip times taken for projected light to be reflected by the objects, thereby being received as reflected light.

However, a distance image sometimes has an error that, with high luminance light reflected from an object having extremely high reflectance or the like, pixel values based on distances different from an actual distance to the object are set.

In view of this, as a technology for reducing this distance image error, for example, there has been proposed a technology that generates a background subtraction image between the taken image of a detection area taken by an imaging apparatus and the background image of this detection area, and detects objects in the background subtraction image to determine whether or not there is noise, to thereby remove noise (see PTL Further, there has been proposed a technology that removes noise in the process of distance image generation (see PTL 2).

CITATION LIST

Patent Literature

[PTL 1]
 Japanese Patent Laid-open No. 2014-056494
[PTL 2]
 Japanese Translations of PCT for Patent No. 2016-509208

SUMMARY

Technical Problem

However, since the technology of PTL 1 detects objects to remove noise with the use of a background subtraction image, there is a fear that noise cannot be appropriately detected in a case where a background changes or a case where the imaging apparatus is moved.

Further, since the technology of PTL 2 is a technology in the process of distance image generation, there is a fear that noise in generated distance images cannot be removed.

The present disclosure has been made in view of such circumstances and makes it possible to remove noise included in distance images, in particular.

Solution to Problem

According to one aspect of the present disclosure, there is provided an image processing apparatus including: a distance image acquiring section configured to acquire a distance image having a pixel value corresponding to a distance to an object imaged; an intensity image acquiring section configured to acquire an intensity image having a pixel value corresponding to a received reflected light intensity of projected light from the object; and a noise removing section configured to convert, into a predetermined pixel value, a pixel value of a pixel in the distance image that corresponds to a pixel having a pixel value smaller than a predetermined threshold in the intensity image, to thereby remove noise in the distance image.

The image processing apparatus can further include a threshold determining section configured to generate a histogram of the pixel value of the intensity image, and determine a pixel value serving as a changing point in the histogram as the predetermined threshold.

The image processing apparatus can further include a filter processing section configured to perform, on the intensity image, processing using a predetermined filter for removing noise.

The filter may include a bilateral filter.

The noise removing section may convert the pixel value of the pixel in the distance image that corresponds to the pixel having the pixel value smaller than the predetermined threshold in the intensity image into a no-detection pixel indicating no detection of the distance, to thereby remove noise in the distance image.

The image processing apparatus may further include: a light projecting section configured to project light; a light receiving section configured to receive reflected light that includes light projected by the light projecting section and then reflected by the object; a distance image generating section configured to obtain a distance to the object in pixel units based on time from when the light projecting section projects the light to when the light receiving section receives the reflected light, and to generate a distance image having a pixel value corresponding to the distance to the object; and an intensity image generating section configured to generate an intensity image having a pixel value corresponding to an intensity of the reflected light that is received by the light receiving section in pixel units. The distance image acquiring section can acquire the distance image generated by the distance image generating section as the distance image having the pixel value corresponding to the distance to the object imaged. The intensity image acquiring section can acquire the intensity image generated by the intensity image generating section as the intensity image having the pixel value corresponding to the received reflected light intensity of the projected light from the object.

The light projecting section can project infrared light.

The distance image may be generated by a triangulation infrared range-finding sensor.

The distance image may be generated by a structured light range-finding sensor.

The distance image may be generated by a stereo camera sensor.

The distance image may be generated based on a three-dimensional point cloud that is measured by LiDAR (Light Detection and Ranging, Laser Imaging Detection and Ranging).

According to one aspect of the present disclosure, there is provided an image processing method including: distance image acquiring processing of acquiring a distance image having a pixel value corresponding to a distance to an object imaged; intensity image acquiring processing of acquiring an intensity image having a pixel value corresponding to a received reflected light intensity of projected light from the object; and noise removing processing of converting, into a predetermined pixel value, a pixel value of a pixel in the distance image that corresponds to a pixel having a pixel value smaller than a predetermined threshold in the intensity image.

According to one aspect of the present disclosure, there is provided a program for causing a computer to execute processing including: a distance image acquiring section configured to acquire a distance image having a pixel value corresponding to a distance to an object imaged; an intensity image acquiring section configured to acquire an intensity image having a pixel value corresponding to a received reflected light intensity of projected light from the object; and a noise removing section configured to convert, into a predetermined pixel value, a pixel value of a pixel in the distance image that corresponds to a pixel having a pixel value smaller than a predetermined threshold in the intensity image.

According to one aspect of the present disclosure, there is provided a moving body including: a distance image acquiring section configured to acquire a distance image having a pixel value corresponding to a distance to an object imaged; an intensity image acquiring section configured to acquire an intensity image having a pixel value corresponding to a received reflected light intensity of projected light from the object; a noise removing section configured to convert, into a predetermined pixel value, a pixel value of a pixel in the distance image that corresponds to a pixel having a pixel value smaller than a predetermined threshold in the intensity image; a situation analyzing section configured to generate an environmental map based on the distance image from which the noise has been removed; a planning section configured to plan a travel route based on the environmental map generated by the situation analyzing section; and an operation control section configured to control operation based on the travel route planned by the planning section.

According to one aspect of the present disclosure, a distance image having a pixel value corresponding to a distance to an object imaged is acquired, an intensity image having a pixel value corresponding to a received reflected light intensity of projected light from the object is acquired, and a pixel value of a pixel in the distance image that corresponds to a pixel having a pixel value smaller than a predetermined threshold in the intensity image is converted into a predetermined pixel value, so that noise in the distance image is removed.

Advantageous Effect of Invention

According to one aspect of the present disclosure, it is possible to remove noise included in distance images.

DESCRIPTION OF EMBODIMENT

Figure 1:
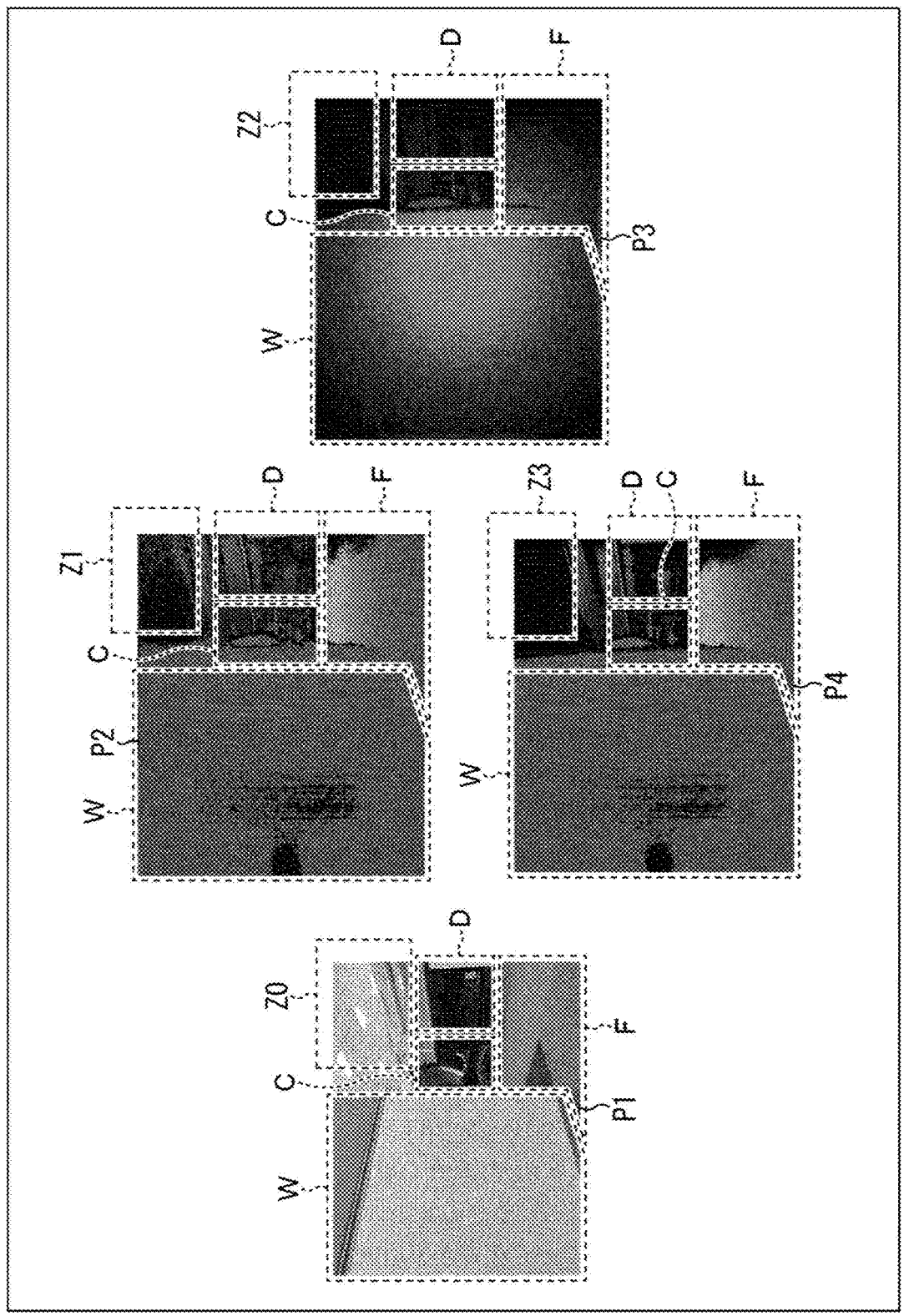
FIG. 1 is a diagram illustrating the outline of the present disclosure.

Now, a preferred embodiment of the present disclosure is described in detail with reference to the attached drawings. Note that, in the specification and the drawings, components having substantially the same functional configuration are denoted by the same reference numeral, and the redundant description is omitted.

Now, a mode for embodying the present technology is described. The description is made in the following order.
1. Outline of Present Disclosure
2. Embodiment of Present Disclosure
3. Application Example
4. Example of Execution by Software 1. Outline of Present Disclosure A moving body of the present disclosure is an autonomous moving body configured to remove noise included in distance images that are acquired as information regarding situations around the moving body, and to perform self-driving on the basis of the distance images from which the noise has been removed.

Distance images are generally taken by cameras called "ToF (Time of Flight) camera." A ToF camera projects infrared light and receives the reflected light reflected by an object to measure a distance to the object on the basis of time between the light projecting timing and the light receiving timing, that is, a round-trip time taken for the light projected to the object to return to the ToF camera. The ToF camera generates an image having pixel values corresponding to the measurement result as a distance image.

For example, a case where an image P1 including a black and white indoor image as illustrated in the left part of FIG. 1 is taken is considered. Here, in the image P1 in FIG. 1, a wall W near the imaging position appears in the left portion in the image, and a floor F appears in the lower right portion. A chair C appears in the left portion on the floor F, and a desk D appears on the right side of the chair C. A ceiling including lighting equipment, which corresponds to an area Z0, appears in the upper right portion.

An image P2 in the upper central part of FIG. 1 is a distance image taken from an imaging position and at an angle that are the same as those used in taking the image P1.

The image P2 is an image in which areas corresponding to the relatively near wall W, the floor F, the chair C, and the desk D in the image P1 are indicated in pixel units by colors depending on distances from the imaging position. Note that, black in the image P2 represents no-detection areas. A no-detection area indicates that the measurement of a distance to the area has failed.

Here, with regard to an area Z1 near the ceiling in the image P2, which corresponds to the area Z0 of the ceiling in the image P1, even though the area Z1 is farther than the wall W, the right area is partly colored with an incorrect color indicating as if the distance to the area Z1 is the same as the distance to the wall W. This indicates that noise occurs.

In a case where an object that reflects projected infrared light is extremely near the infrared light projecting position or in a case where the reflectance is high, the emitted infrared light is sometimes diffusely reflected. A region from which reflected infrared light does not return since the object is far, for example, is to be determined as a no-detection area, but diffusely reflected light sometimes becomes dominant. As represented by the area Z1 in the image P2, the region is consequently colored with not black indicating no detection but colors indicating distances, and thus appears as noise in some cases.

In the present disclosure, noise that occurs due to diffusion reflection is removed with the use of an infrared image having the received light intensities of reflected light that is infrared light projected to be reflected by objects.

An infrared image corresponding to the image P1 is, for example, an image P3 in the right part of FIG. 1. The image P3 is an infrared image taken from the same imaging position and at the same angle as the image P1.

The image P3 is an image having pixel values corresponding to the intensities of reflected light that is projected infrared light reflected by the objects. An area Z2 corresponding to the area Z1 in the image P2 is indicated by black pixels. That is, it is indicated that no reflected light has been detected and the object is far from the imaging position.

Thus, in the present disclosure, the image P2 which is a distance image and the image P3 which is an infrared image are compared to each other. Pixels in a region corresponding to an object that is obviously far from an imaging position are indicated by the black pixels in the image P3 which is an infrared image. In this case, the corresponding pixels in the image P2 which is a distance image are regarded as noise and replaced by no-detection pixels even when the pixels have pixel values indicating distances.

Through this processing, although the right area of the area Z1 is partly indicated by the pixels indicating obtained distances other than black pixels in the image P2 which is a distance image, the corresponding area Z2 in the image P3 which is an infrared image is indicated by the black pixels. It is indicated that the object is far. With the pixels in the area Z1 replaced by black pixels representing no-detection pixels, an image P4 that is a distance image as illustrated in the lower central part of FIG. 1 is generated.

As a result, pixels partly colored as if distances have been obtained as represented by the area Z1 in the image P2 which is a distance image are regarded as noise to be removed as indicated by the image P4. Noise in distance images can therefore be removed.

2. Embodiment of Present Disclosure

A moving body of the present disclosure is a moving body configured to remove noise included in a distance image that is acquired as situations around the moving body, generate an environmental map on the basis of the distance image from which the noise has been removed, plan a travel route depending on the environmental map, and autonomously travel on the planned travel route. In the following, an example of a case where the moving body of the present disclosure is a vehicle is described. Needless to say, however, the moving body may be any moving body other than a vehicle.

Figure 2:
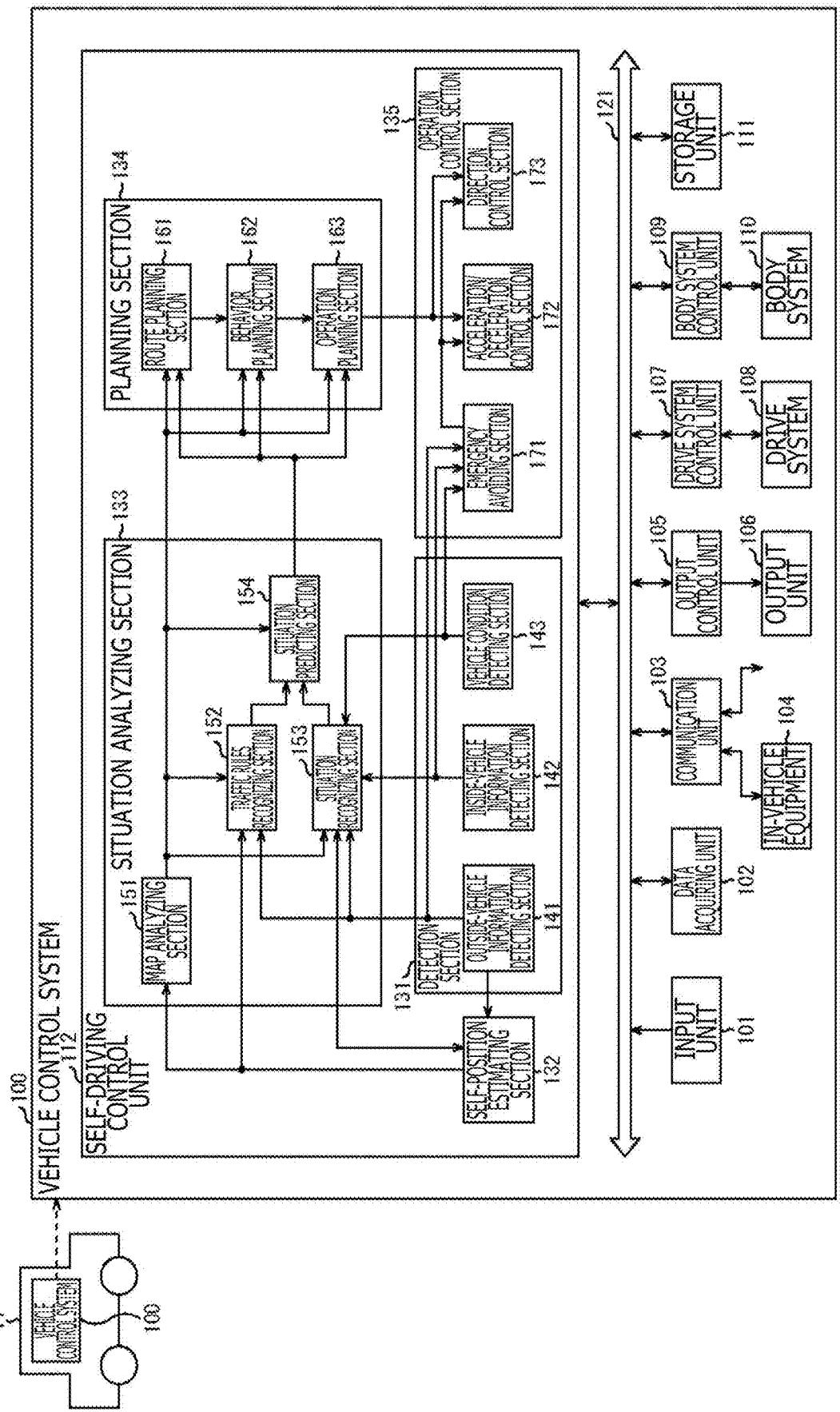
FIG. 2 is a block diagram illustrating a configuration example of a vehicle control system of the present disclosure.

FIG. 2 is a block diagram illustrating a configuration example of the schematic function of a vehicle control system 100 of a vehicle 11. The vehicle control system 100 is an example of a moving body control system to which the present technology is applicable.

Note that, in the following description, in a case where the vehicle 11 including the vehicle control system 100 is distinguished from another vehicle, the vehicle 11 is referred to as "vehicle in question."

The vehicle control system 100 includes an input unit 101, a data acquiring unit 102, a communication unit 103, in-vehicle equipment 104, an output control unit 105, an output unit 106, a drive system control unit 107, a drive system 108, a body system control unit 109, a body system 110, a storage unit 111, and a self-driving control unit 112. The input unit 101, the data acquiring unit 102, the communication unit 103, the output control unit 105, the drive system control unit 107, the body system control unit 109, the storage unit 111, and the self-driving control unit 112 are connected to each other via a communication network 121. Examples of the communication network 121 include vehicle-mounted communication networks in accordance with any standard, such as CAN (Controller Area Network), LIN (Local Interconnect Network), LAN (Local Area Network), and FlexRay (registered trademark), and buses. Note that, the respective parts of the vehicle control system 100 are directly connected to each other without the communication network 121 in some cases.

Note that, in the following description, in a case where the respective parts of the vehicle control system 100 communicate with each other via the communication network 121, the description of the communication network 121 is omitted. For example, a case where the input unit 101 and the self-driving control unit 112 communicate with each other via the communication network 121 is simply described as a case where the input unit 101 and the self-driving control unit 112 communicate with each other.

The input unit 101 includes an apparatus that an occupant uses to input various data, instructions, or the like. For example, the input unit 101 includes operation devices such as a touch panel, a button, a microphone, a switch, and a lever, and operation devices configured to support input methods other than manual operation, such as voice input and gesture input. Further, for example, the input unit 101 may be a remote-control apparatus utilizing infrared rays or other radio waves, or externally connected equipment configured to be operated by the vehicle control system 100, such as mobile equipment or wearable equipment. The input unit 101 generates input signals on the basis of data, instructions, or the like input by the occupant, and supplies the input signals to each part of the vehicle control system 100.

The data acquiring unit 102 includes, for example, various sensors configured to acquire data that is used in processing by the vehicle control system 100, and supplies the acquired data to each part of the vehicle control system 100.

For example, the data acquiring unit 102 includes various sensors for detecting the conditions or the like of the vehicle in question. Specifically, for example, the data acquiring unit 102 includes a gyro sensor, an acceleration sensor, an inertial measurement unit (IMU), and sensors for detecting the amount of accelerator pedal operation, the amount of brake pedal operation, steering wheel steering angles, engine speed, motor speed, wheel rotational speed, or the like.

Further, for example, the data acquiring unit 102 includes various sensors for detecting information outside the vehicle in question. Specifically, for example, the data acquiring unit 102 includes an imaging apparatus such as a ToF (Time Of Flight) camera, a stereo camera, a monocular camera, an infrared camera, or other cameras. Further, for example, the data acquiring unit 102 includes an environmental sensor for detecting weather, an atmospheric phenomenon or the like, and a peripheral information detecting sensor for detecting objects around the vehicle in question. Examples of the environmental sensor include rain sensors, fog sensors, sunlight sensors, and snow sensors. Examples of the peripheral information detecting sensor include ultrasonic sensors, radars, LiDAR (Light Detection and Ranging, Laser Imaging Detection and Ranging), and sonars.

Moreover, for example, the data acquiring unit 102 includes various sensors for detecting the current position of the vehicle in question. Specifically, for example, the data acquiring unit 102 includes a GNSS receiver configured to receive GNSS signals from GNSS (Global Navigation Satellite System) satellites.

Further, for example, the data acquiring unit 102 includes various sensors for detecting inside-vehicle information. Specifically, for example, the data acquiring unit 102 includes an imaging apparatus configured to image a driver, a biological sensor configured to detect biological information regarding the driver, and a microphone configured to collect sound inside the vehicle. The biological sensor is provided to each seat or the steering wheel, for example, and detects biological information regarding the occupant sitting on the seat or the driver grabbing the steering wheel.

The communication unit 103 communicates with the in-vehicle equipment 104 and various types of equipment outside the vehicle, servers, base stations, or the like, and transmits data supplied from each part of the vehicle control system 100 or supplies received data to each part of the vehicle control system 100. Note that, communication protocols with which the communication unit 103 is compatible are not particularly limited. Further, the communication unit 103 can be compatible with a plurality of types of communication protocols.

For example, the communication unit 103 wirelessly communicates with the in-vehicle equipment 104 via a wireless LAN, Bluetooth (registered trademark), NFC (Near Field Communication), WUSB (Wireless USB) or the like. Further, for example, the communication unit 103 communicates with the in-vehicle equipment 104 by wired communication through a connection terminal (and a cable if needed) which is not illustrated, with the use of a USB (Universal Serial Bus), an HDMI (registered trademark) (High Definition Multimedia Interface), an MHL (Mobile High-definition Link) or the like.

Moreover, for example, the communication unit 103 communicates, via base stations or access points, with equipment (for example, application servers or control servers) on external networks (for example, the Internet, cloud networks, or company-specific networks). Further, for example, the communication unit 103 uses the P2P (Peer To Peer) technology to communicate with terminals (for example, pedestrian's terminal, store's terminal, or MTC (Machine Type Communication) terminal) near the vehicle in question. Moreover, for example, the communication unit 103 performs V2X communication such as Vehicle to Vehicle communication, Vehicle to Infrastructure communication, Vehicle to Home communication, and Vehicle to Pedestrian communication. Further, for example, the communication unit 103 includes a beacon receiving section, and receives radio waves or electromagnetic waves that are transmitted from wireless stations or the like installed on roads to acquire information regarding a current position, traffic jams, traffic restrictions, required time, or the like.

The in-vehicle equipment 104 includes, for example, mobile equipment or wearable equipment of the occupant, information equipment that is brought in or mounted on the vehicle in question, and a navigation apparatus configured to search for routes to any destination.

The output control unit 105 controls the output of various pieces of information to the occupant of the vehicle in question or outside the vehicle. For example, the output control unit 105 generates an output signal including at least one of visual information (for example, image data) or auditory information (for example, sound data), and supplies the output signal to the output unit 106, to thereby control the output of visual information and auditory information from the output unit 106. Specifically, for example, the output control unit 105 combines the data of images taken by a different imaging apparatus of the data acquiring unit 102 to generate a bird's-eye image, a panoramic image or the like, and supplies an output signal including the generated image to the output unit 106. Further, for example, the output control unit 105 generates sound data including, for example, sound or messages warning dangers such as collisions, minor collisions, or entries into dangerous zones, and supplies an output signal including the generated sound data to the output unit 106.

The output unit 106 includes an apparatus capable of outputting visual information or auditory information to the occupant of the vehicle in question or outside the vehicle. For example, the output unit 106 includes a display apparatus, an instrument panel, an audio speaker, a headphone, a wearable device that the occupant wears, such as a glasses-type display, a projector, or a lamp. The display apparatus of the output unit 106 may be, other than an apparatus including a normal display, an apparatus configured to display visual information in the field of view of the driver, such as a head-up display, a transmissive display, or an apparatus having an AR (Augmented Reality) display function, for example.

The drive system control unit 107 generates various control signals and supplies the control signals to the drive system 108, to thereby control the drive system 108. Further, the drive system control unit 107 supplies the control signals to each part other than the drive system 108 to notify each part of the control states of the drive system 108 as needed, for example.

The drive system 108 includes various apparatuses related to the drive system of the vehicle in question. For example, the drive system 108 includes a driving force generating apparatus for generating driving force for the internal combustion engine, the drive motor, or the like, a driving force transmitting system for transmitting driving force to the wheels, a steering mechanism configured to adjust steering angles, a braking apparatus configured to generate braking force, an ABS (Antilock Brake System), ESC (Electronic Stability Control), and an electric power steering apparatus.

The body system control unit 109 generates various control signals and supplies the control signals to the body system 110, to thereby control the body system 110. Further, the body system control unit 109 supplies the control signals to each part other than the body system 110 to notify each part of the control states of the body system 110 as needed, for example.

The body system 110 includes various body system apparatuses mounted on the vehicle body. For example, the body system 110 includes a keyless entry system, a smart key system, a power window apparatus, power seats, a steering wheel, an air conditioning apparatus, and various lamps (for example, headlamps, backup lamps, brake lamps, blinkers, and fog lamps).

The storage unit 111 includes, for example, a magnetic storage device such as a ROM (Read Only Memory), a RAM (Random Access Memory), or an HDD (Hard Disc Drive), a semiconductor storage device, an optical storage device, and a magneto-optical storage device. The storage unit 111 stores, for example, various programs or data to be used in each part of the vehicle control system 100. For example, the storage unit 111 stores map data such as three-dimensional highly accurate maps such as dynamic maps, global maps having lower accuracy than the highly accurate maps and covering wider areas than the highly accurate maps, and local maps including peripheral information regarding the vehicle in question.

The self-driving control unit 112 performs control related to self-driving, such as autonomous driving or driving assistance. Specifically, for example, the self-driving control unit 112 performs cooperative control for the purpose of achieving an ADAS (Advanced Driver Assistance System) function including the collision avoidance or shock mitigation of the vehicle in question, following driving based on vehicle to vehicle distances, vehicle speed maintaining driving, collision warning for the vehicle in question, lane departure warning for the vehicle in question, or the like. Further, for example, the self-driving control unit 112 performs cooperative control for the purpose of achieving, for example, self-driving that allows the vehicle to autonomously travel without the driver's operation. The self-driving control unit 112 includes a detection section 131, a self-position estimating section 132, a situation analyzing section 133, a planning section 134, and an operation control section 135.

The detection section 131 detects various pieces of information necessary for self-driving control. The detection section 131 includes an outside-vehicle information detecting section 141, an inside-vehicle information detecting section 142, and a vehicle condition detecting section 143.

The outside-vehicle information detecting section 141 performs the processing of detecting information outside the vehicle in question on the basis of data or signals from each part of the vehicle control system 100. For example, the outside-vehicle information detecting section 141 performs the processing of detecting, recognizing, and tracking objects around the vehicle in question, and the processing of detecting distances to the objects. Examples of the objects to be detected include vehicles, humans, obstacles, structures, roads, traffic lights, traffic signs, and road signs. Further, for example, the outside-vehicle information detecting section 141 performs the processing of detecting the surrounding environment of the vehicle in question. Examples of the surrounding environment to be detected include weather, temperature, humidity, brightness, and road conditions. The outside-vehicle information detecting section 141 supplies data indicating the result in the detection processing to the self-position estimating section 132, a map analyzing section 151, a traffic rules recognizing section 152, and a situation recognizing section 153 of the situation analyzing section 133, an emergency avoiding section 171 of the operation control section 135, and the like.

The inside-vehicle information detecting section 142 performs the processing of detecting inside-vehicle information on the basis of data or signals from each part of the vehicle control system 100. For example, the inside-vehicle information detecting section 142 performs the processing of authenticating and recognizing the driver, the processing of detecting the driver's conditions, the processing of detecting occupants, the processing of detecting inside-vehicle environment, and the like. Examples of the driver's conditions to be detected include physical conditions, alertness, concentration, fatigue, and line-of-sight directions. Examples of the inside-vehicle environment to be detected include temperature, humidity, brightness, and smells. The inside-vehicle information detecting section 142 supplies data indicating the result in the detection processing to the situation recognizing section 153 of the situation analyzing section 133, the emergency avoiding section 171 of the operation control section 135, and the like.

The vehicle condition detecting section 143 performs the processing of detecting the conditions of the vehicle in question on the basis of data or signals from each part of the vehicle control system 100. Examples of the conditions of the vehicle in question to be detected include speed, acceleration, steering angles, whether or not there is an abnormality, the details of an abnormality, driving operation states, the positions and inclination of the power seats, whether the door locks are locked or unlocked, and the conditions of other vehicle-mounted equipment. The vehicle condition detecting section 143 supplies data indicating the result in the detection processing to the situation recognizing section 153 of the situation analyzing section 133, the emergency avoiding section 171 of the operation control section 135, and the like.

The self-position estimating section 132 performs the processing of estimating, for example, the locations and attitudes of the vehicle in question on the basis of data or signals from the respective parts of the vehicle control system 100, such as the outside-vehicle information detecting section 141 and the situation recognizing section 153 of the situation analyzing section 133. Further, the self-position estimating section 132 generates, as needed, local maps that are used to estimate self-positions (hereinafter referred to as "map for self-position estimation"). The maps for self-position estimation are, for example, highly accurate maps using a technology such as SLAM (Simultaneous Localization and Mapping). The self-position estimating section 132 supplies data indicating the result in the estimation processing to the map analyzing section 151, the traffic rules recognizing section 152, and the situation recognizing section 153 of the situation analyzing section 133, and the like. Further, the self-position estimating section 132 stores the maps for self-position estimation in the storage unit 111.

The situation analyzing section 133 performs the processing of analyzing the states of the vehicle in question and situations around the vehicle in question. The situation analyzing section 133 includes the map analyzing section 151, the traffic rules recognizing section 152, the situation recognizing section 153, and a situation predicting section 154.

The map analyzing section 151 performs the processing of analyzing various maps stored in the storage unit 111 while using, as needed, data or signals from the respective parts of the vehicle control system 100, such as the self-position estimating section 132 and the outside-vehicle information detecting section 141, to thereby built maps including information necessary for self-driving processing. The map analyzing section 151 supplies the built maps to the traffic rules recognizing section 152, the situation recognizing section 153, the situation predicting section 154, and a route planning section 161, a behavior planning section 162, and an operation planning section 163 of the planning section 134, for example.

The traffic rules recognizing section 152 performs the processing of recognizing traffic rules around the vehicle in question on the basis of data or signals from the respective parts of the vehicle control system 100, such as the self-position estimating section 132, the outside-vehicle information detecting section 141, and the map analyzing section 151. Through this recognition processing, for example, the locations and states of traffic signals around the vehicle in question, the details of traffic regulations around the vehicle in question, lanes on which the vehicle can travel, and the like are recognized. The traffic rules recognizing section 152 supplies data indicating the result in the recognition processing to the situation predicting section 154 and the like.

The situation recognizing section 153 performs the processing of recognizing situations related to the vehicle in question on the basis of data or signals from the respective parts of the vehicle control system 100, such as the self-position estimating section 132, the outside-vehicle information detecting section 141, the inside-vehicle information detecting section 142, the vehicle condition detecting section 143, and the map analyzing section 151. For example, the situation recognizing section 153 performs the processing of recognizing the states of the vehicle in question, situations around the vehicle in question, and the conditions of the driver of the vehicle in question. Further, the situation recognizing section 153 generates, as needed, local maps that are used to recognize situations around the vehicle in question (hereinafter referred to as "map for situation recognition"). The maps for situation recognition are, for example, occupancy grid maps.

Examples of the states of the vehicle in question to be recognized include the locations, attitudes, and movement (for example, speed, acceleration, or driving direction) of the vehicle in question, whether or not there is an abnormality, and the details of an abnormality. Examples of the situations around the vehicle in question to be recognized include kinds of stationary object around the vehicle, the positions of the stationary objects, kinds of moving object around the vehicle, the positions of the moving objects, the movement of the moving objects (for example, speed, acceleration, or driving direction), the configurations of roads around the vehicle, road surface conditions, and weather, temperature, humidity, and brightness around the vehicle. Examples of the driver's conditions to be recognized include physical conditions, alertness, concentration, fatigue, line-of-sight directions, and driving operation.

The situation recognizing section 153 supplies data indicating the result in the recognition processing (including a map for situation recognition as needed) to the self-position estimating section 132, the situation predicting section 154 and the like. Further, the situation recognizing section 153 stores the map for situation recognition in the storage unit 111.

The situation predicting section 154 performs the processing of predicting situations related to the vehicle in question on the basis of data or signals from the respective parts of the vehicle control system 100, such as the map analyzing section 151, the traffic rules recognizing section 152, and the situation recognizing section 153. For example, the situation predicting section 154 performs the processing of predicting the states of the vehicle, situations around the vehicle in question, the driver's conditions and the like.

Examples of the states of the vehicle in question to be predicted include the behavior of the vehicle in question, the occurrence of an abnormality, and travelable distances. Examples of the situations around the vehicle in question to be predicted include the behavior of moving objects around the vehicle in question, changes in state of traffic signals, and environmental changes such as changes in weather. Examples of the driver's conditions to be predicted include the driver's behavior and physical conditions.

The situation predicting section 154 supplies data indicating the result in the prediction processing to the route planning section 161, the behavior planning section 162, and the operation planning section 163 of the planning section 134, and the like, together with data from the traffic rules recognizing section 152 and the situation recognizing section 153.

The route planning section 161 plans a route to a destination on the basis of data or signals from the respective parts of the vehicle control system 100, such as the map analyzing section 151 and the situation predicting section 154. For example, the route planning section 161 sets a route from a current position to a designated destination on the basis of a global map. Further, for example, the route planning section 161 appropriately changes the route on the basis of situations such as traffic jams, accidents, traffic regulations, or constructions, and the driver's physical conditions. The route planning section 161 supplies data indicating the planned route to the behavior planning section 162 and the like.

The behavior planning section 162 plans a behavior of the vehicle in question that allows the vehicle to safely travel on a route planned by the route planning section 161 within planned time, on the basis of data or signals from the respective parts of the vehicle control system 100, such as the map analyzing section 151 and the situation predicting section 154. For example, the behavior planning section 162 plans start, stop, travel directions (for example, moving forward, moving backward, turning left, turning right, turning around or the like), travel lanes, travel speed, passing and the like. The behavior planning section 162 supplies data indicating the planned behavior of the vehicle in question to the operation planning section 163 and the like.

The operation planning section 163 plans operation of the vehicle in question for achieving a behavior planned by the behavior planning section 162, on the basis of data or signals from the respective parts of the vehicle control system 100, such as the map analyzing section 151 and the situation predicting section 154. For example, the operation planning section 163 plans acceleration, deceleration, traveling tracks and the like. The operation planning section 163 supplies data indicating the planned operation of the vehicle in question to an acceleration/deceleration control section 172 and a direction control section 173 of the operation control section 135, and the like.

The operation control section 135 performs operation control of the vehicle in question. The operation control section 135 includes the emergency avoiding section 171, the acceleration/deceleration control section 172, and the direction control section 173.

The emergency avoiding section 171 performs the processing of detecting emergency such as collisions, minor collisions, entries into dangerous zones, the driver's abnormalities, or the vehicle's abnormalities on the basis of detection results of the outside-vehicle information detecting section 141, the inside-vehicle information detecting section 142, and the vehicle condition detecting section 143. In a case where the emergency avoiding section 171 detects the occurrence of emergency, the emergency avoiding section 171 plans operation of the vehicle in question for avoiding the emergency, such as sudden braking or sudden turning. The emergency avoiding section 171 supplies data indicating the planned operation of the vehicle in question to the acceleration/deceleration control section 172, the direction control section 173 and the like.

The acceleration/deceleration control section 172 performs acceleration/deceleration control for achieving the operation of the vehicle in question planned by the operation planning section 163 or the emergency avoiding section 171. For example, the acceleration/deceleration control section 172 calculates a control target value for the driving force generating apparatus or the braking apparatus for achieving acceleration, deceleration, or sudden braking, which has been planned, and supplies a control instruction indicting the calculated control target value to the drive system control unit 107.

The direction control section 173 performs direction control for achieving the operation of the vehicle in question planned by the operation planning section 163 or the emergency avoiding section 171. For example, the direction control section 173 calculates a control target value for the steering mechanism for achieving a traveling track or sudden turning planned by the operation planning section 163 or the emergency avoiding section 171, and supplies a control instruction indicating the calculated control target value to the drive system control unit 107.

<Example of Configuration that Generates Distance Image>

Figure 3:
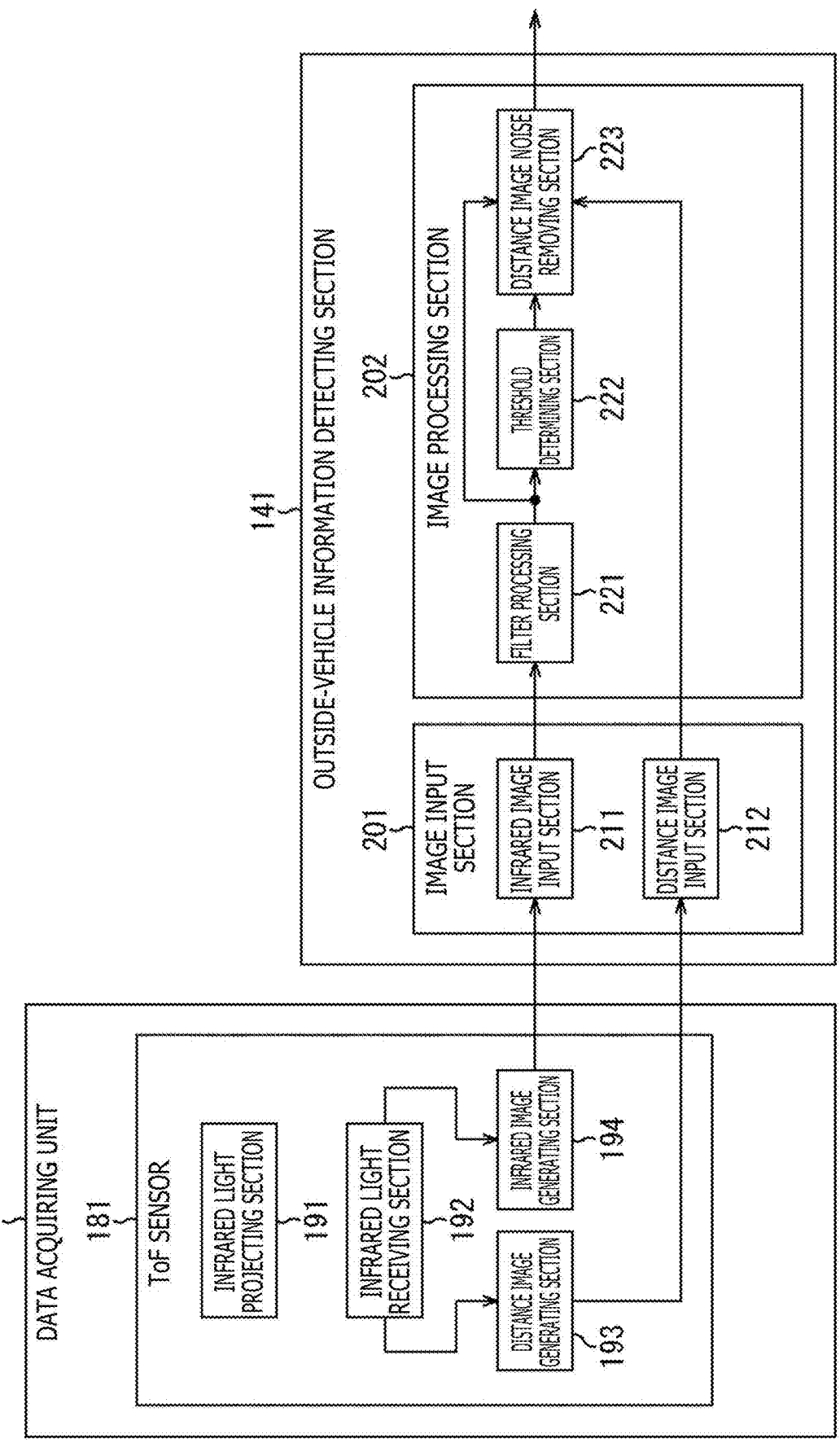
FIG. 3 is a diagram illustrating an example of a configuration that generates distance images in the vehicle control system in FIG. 2.

Next, with reference to FIG. 3, an example of a configuration that generates distance images in the vehicle control system 100 in FIG. 1 is described.

The configuration that generates distance images includes the data acquiring unit 102 and the outside-vehicle information detecting section 141 in the vehicle control system 100 in FIG. 1.

The data acquiring unit 102 includes a ToF (Time of Flight) sensor 181 configured to generate distance images and infrared images having infrared light intensities as pixel values. Further, the outside-vehicle information detecting section 141 includes an image input section 201 configured to receive the input of distance images and infrared images, and an image processing section 202 configured to remove noise in distance images using infrared images.

In more detail, the ToF sensor 181 includes an infrared light projecting section 191, an infrared light receiving section 192, a distance image generating section 193, and an infrared image generating section 194.

The infrared light projecting section 191 projects infrared light to the front area in the travelling direction of the vehicle 11, which is to be monitored, for example. Note that, when projecting infrared light, the infrared light projecting section 191 outputs, to the distance image generating section 193, a signal indicating the infrared light projecting timing.

The infrared light receiving section 192 receives infrared light that includes infrared light projected by the infrared light projecting section 191 and then reflected by objects. The infrared light receiving section 192 outputs the light receiving timings to the distance image generating section 193 in pixel units, and outputs the received light intensity information to the infrared image generating section 194 in pixel units.

The distance image generating section 193 obtains distances from round-trip times of infrared light with respect to objects on the basis of a timing at which the infrared light is projected by the infrared light projecting section 191, and light receiving timings in pixel units that are supplied from the infrared light receiving section 192. The distance image generating section 193 generates a distance image having pixel values corresponding to the obtained distances, and outputs the distance image to the outside-vehicle information detecting section 141.

The infrared image generating section 194 generates, on the basis of received infrared light intensity information in pixel units that is supplied from the infrared light receiving section 192, an infrared image having pixel values corresponding to the received light intensities. The infrared image generating section 194 outputs the infrared image to the outside-vehicle information detecting section 141.

That is, the ToF sensor 181 projects infrared light, and receives the reflected light of the projected infrared light from objects to generate a distance image and an infrared image. The ToF sensor 181 outputs the distance image and the infrared to the outside-vehicle information detecting section 141. Note that, the ToF sensor 181 in FIG. 3 is a configuration example that uses, when generating an infrared image and a distance image, the same infrared light projected by the same infrared light projecting section 191. The ToF sensor 181 may, however, project infrared light necessary for each infrared image and distance image from two individual light projecting sections. Note that, in this case, the two light projecting sections desirably project light at substantially the same angle and timing.

The outside-vehicle information detecting section 141 includes the image input section 201 and the image processing section 202, and receives the input of distance images and infrared images to remove noise in the distance images. The outside-vehicle information detecting section 141 outputs the distance images.

In more detail, the image input section 201 includes an infrared image input section 211 and a distance image input section 212. The infrared image input section 211 receives infrared images that are input from the ToF sensor 181 of the data acquiring unit 102, and outputs the infrared images to a filter processing section 221 of the image processing section 202. The distance image input section 212 receives distance images that are input from the ToF sensor 181 of the data acquiring unit 102, and outputs the distance images to a distance image noise removing section 223 of the image processing section 202.

The image processing section 202 includes the filter processing section 221, a threshold determining section 222, and the distance image noise removing section 223.

The filter processing section 221 performs filter processing of removing noise in infrared images, and outputs the infrared images to the threshold determining section 222 and the distance image noise removing section 223. The filter processing is desirably performed using a filter that removes noise while keeping the contours, for example, a bilateral filter. Further, in a case where it is known in advance that an infrared image has little noise which is ignorable, the filter processing section 221 may be omitted.

Figure 4:
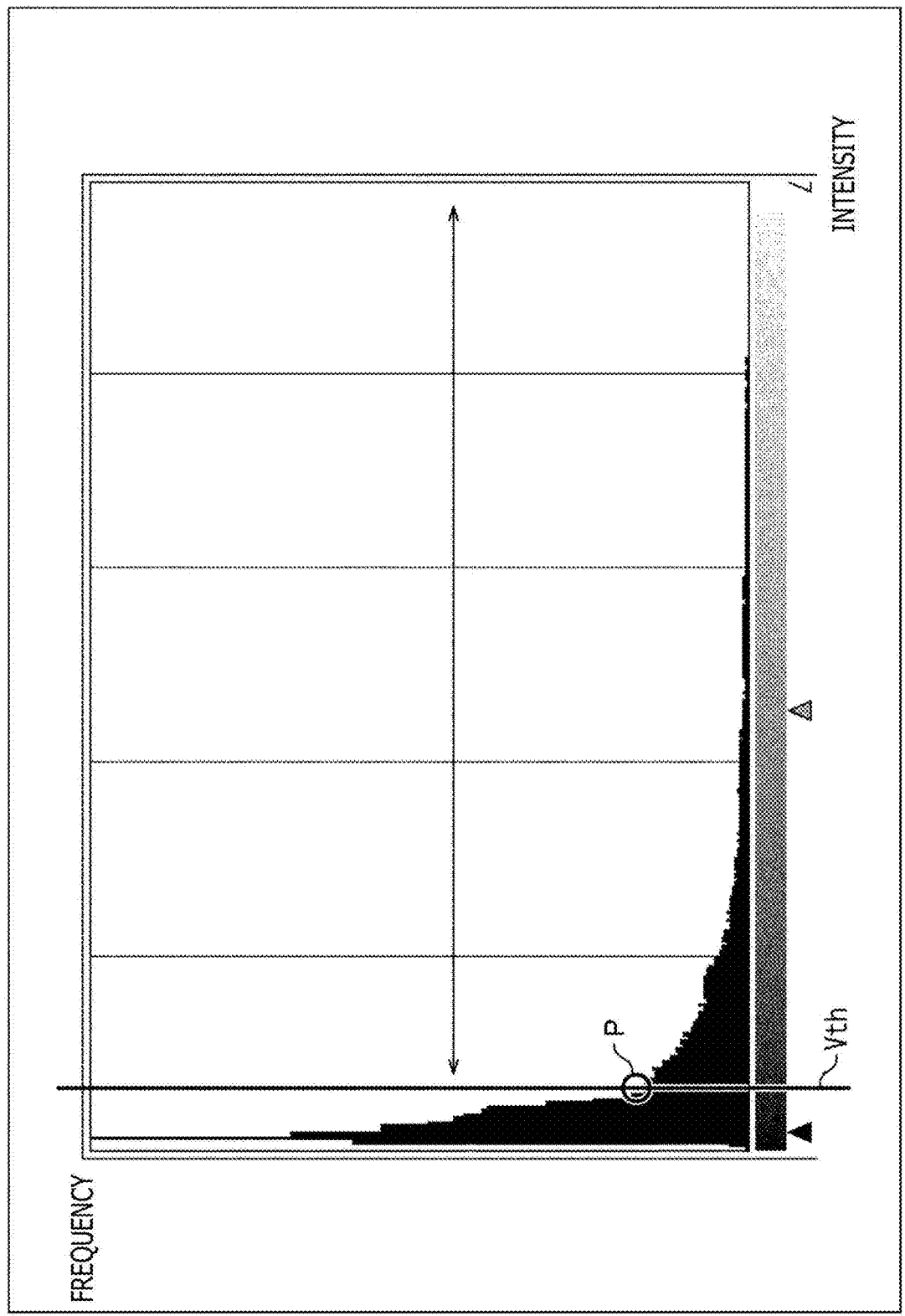
FIG. 4 is a diagram illustrating a method of determining an intensity threshold for indicating the success of reception of light reflected from objects in an infrared image in error removal.

The threshold determining section 222 determines an intensity threshold for determining whether a pixel in an infrared image can be regarded as indicating no reflection of projected infrared light from objects. More specifically, the threshold determining section 222 obtains the histogram of pixel values corresponding to intensities in an infrared image as illustrated in FIG. 4, for example, and determines, from a changing point in the gradient of the histogram, the intensity threshold for determining whether a pixel can be regarded as indicating no reflected light reception. Note that, in FIG. 4, the horizontal axis indicates the received light intensity, and the vertical axis indicates the frequency of each received light intensity, that is, the number of pixels having the corresponding intensity.

For example, in the case of the histogram of FIG. 4, at an intensity P, the frequency representing the distribution rapidly changes. That is, pixels, in an area indicated by the arrow, that have higher received light intensity than the intensity P are regarded as corresponding to the distribution of pixels that indicate reflected light reception and have appropriate intensities. In contrast to this, with regard to the distribution of pixels having intensities smaller than the intensity P in the gradient of the histogram of FIG. 4, since the distribution rapidly changes, the pixels are regarded as not having intensities that are obtained as a result of reflected light reception.

Thus, the threshold determining section 222 determines, on the basis of the position of a changing point, which is represented by the intensity P in the received light intensity histogram, a threshold serving as the minimum value of the intensity of infrared light that is received as reflected light. The threshold determining section 222 outputs the threshold to the distance image noise removing section 223. Thus, in the example in FIG. 4, the threshold is a threshold Vth corresponding to the intensity P as a changing point.

The distance image noise removing section 223 sets, on the basis of whether or not set pixel values based on the received light intensities of the respective pixels in an infrared image are smaller than a threshold, the pixel value of each pixel in a distance image to a no-detection pixel, to thereby remove noise. The distance image noise removing section 223 outputs the distance image.

Figure 5:
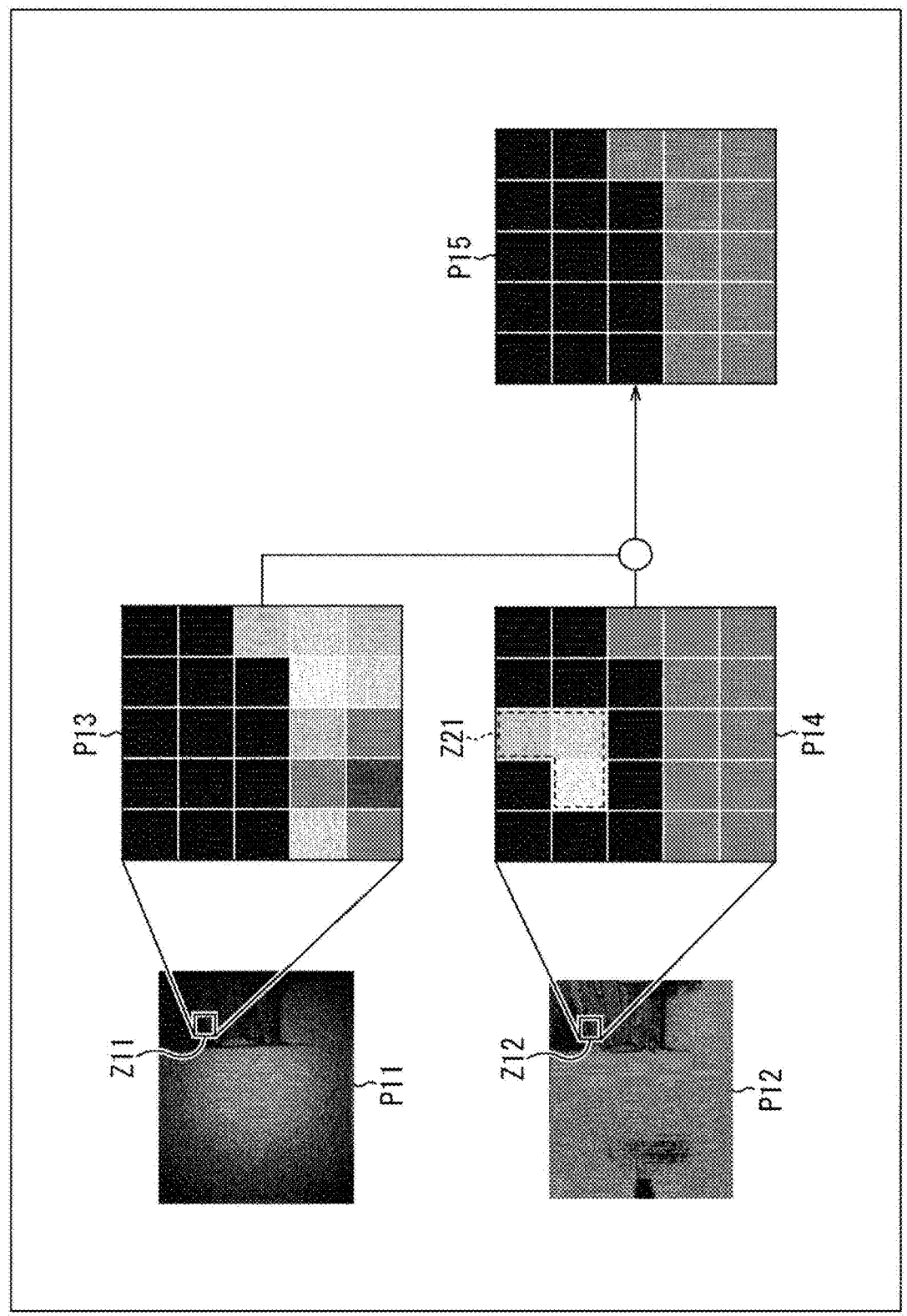
FIG. 5 is a diagram illustrating a noise removing method.

For example, the following case is considered: in a case where an infrared image P11 illustrated in the upper left part of FIG. 5 and a distance image P12 illustrated in the lower left part of FIG. 5 are taken by the ToF sensor 181, an image P13 included in a region Z11 and corresponding to the infrared image P11 in the upper central part of FIG. 5 and an image P14 included in a region Z12 and corresponding to the distance image P12 in the lower central part of FIG. 5 are obtained.

The image P13 included in the infrared image has black pixels, in the upper portion of the image P13, that indicate no reception of the reflected light of infrared light. In contrast to this, the image P14 included in the distance image has pixels indicating distances in a region Z21 in the upper portion of the image P14. Since a region corresponding to the region Z21 in the image P13 included in the infrared image indicates no infrared light reception, it can be considered that noise occurs in the region Z21 in the image P14.

Thus, with respect to each pixel in the image P13 included in the infrared image, the distance image noise removing section 223 sets, when there is a pixel having a pixel value smaller than a threshold that is supplied from the threshold determining section 222, the pixel value of a pixel at the corresponding position in the image P14 included in the distance image to a no-detection pixel (no-distance pixel), to thereby remove noise.

As a result, although noise is included in the region Z21 in the image P14 included in the distance image, when the images are input, since the pixels corresponding to the region Z21 in the image P13 included in the infrared image have pixel values smaller than the threshold, the pixel values of the pixels in the region Z21 in the image P14 included in the corresponding distance image are replaced by no-detection pixels (black pixels) having a pixel value of zero. Through this replacement, noise can be removed as indicated by an image P15.

<Distance Image Noise Removing Processing>

Figure 6:
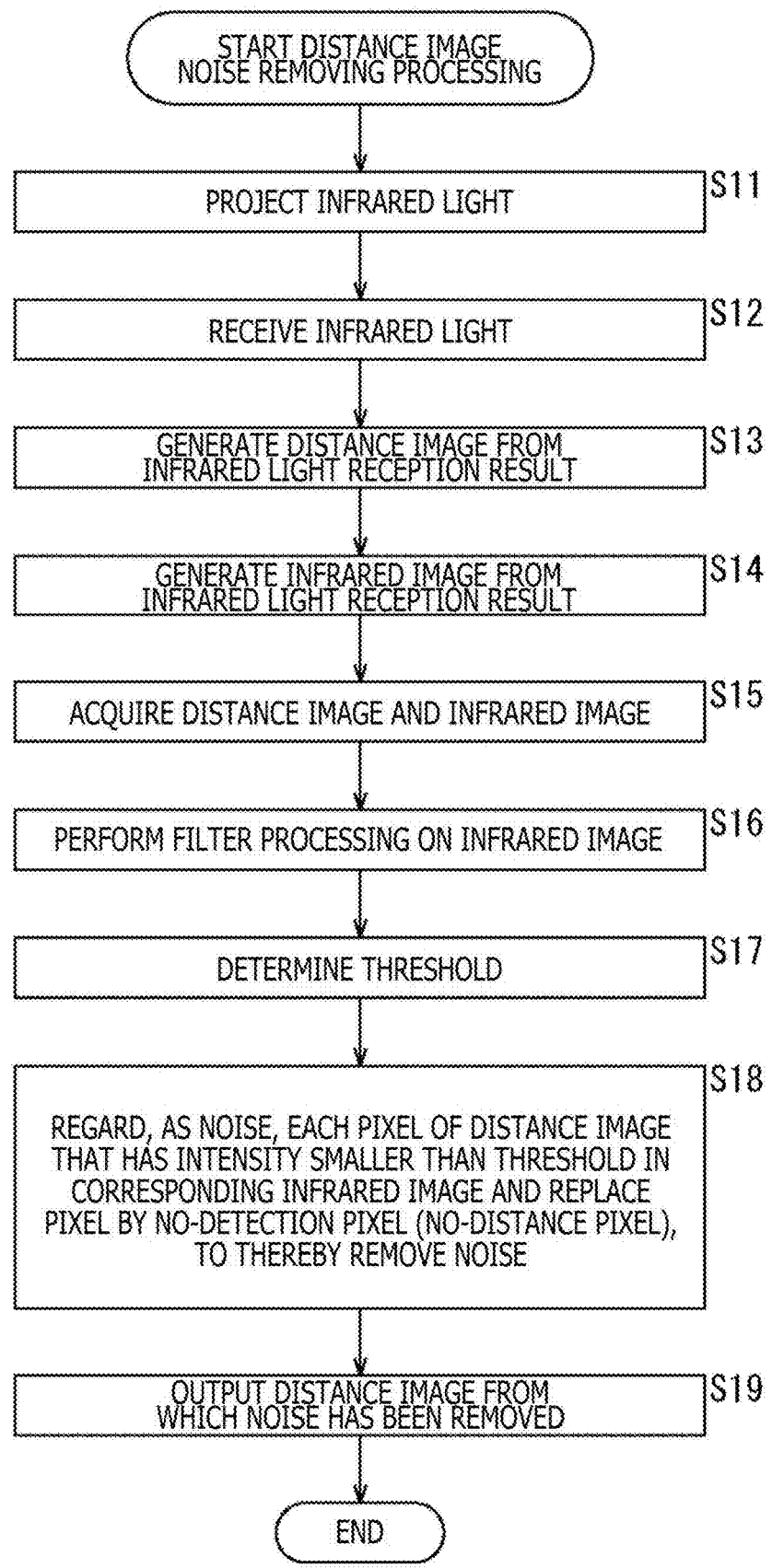
FIG. 6 is a flowchart illustrating distance image noise removing processing.

Next, with reference to the flowchart of FIG. 6, distance image noise removing processing with the configuration that generates distance images in FIG. 3 is described.

In Step S11, the infrared light projecting section 191 of the ToF sensor 181 in the data acquiring unit 102 projects infrared light to a monitoring region, for example, the front area in the travelling direction of the vehicle 11. Here, the infrared light projecting section 191 outputs the infrared light projecting timing information to the distance image generating section 193.

In Step S12, the infrared light receiving section 192 receives, of the infrared light projected by the infrared light projecting section 191, infrared light reflected by objects, and outputs the light receiving timing information in pixel units to the distance image generating section 193 and outputs the received infrared light intensities in pixel units to the infrared image generating section 194.

In Step S13, the distance image generating section 193 obtains round-trip times of the infrared light with respect to the objects in pixel units from information regarding the light receiving timing of each pixel that is supplied from the infrared light receiving section 192 and information regarding the timing of infrared light projection by the infrared light projecting section 191. The distance image generating section 193 obtains distances to the objects on the basis of the round-trip times. The distance image generating section 193 generates a distance image having a pixel value corresponding to the obtained distance and outputs the distance image to the outside-vehicle information detecting section 141. Note that, in round-trip time measurement, in general, transmission-reception phase differences are measured to be used.

In Step S14, the infrared image generating section 194 generates an infrared image having pixel values based on the received infrared light intensities in pixel units that are supplied from the infrared light receiving section 192, and outputs the infrared image to the outside-vehicle information detecting section 141.

In Step S15, the infrared image input section 211 of the image input section 201 in the outside-vehicle information detecting section 141 receives the input of the infrared image and outputs the infrared image to the filter processing section 221 of the image processing section 202. The distance image input section 212 of the image input section 201 in the outside-vehicle information detecting section 141 receives the input of the distance image and outputs the distance image to the distance image noise removing section 223 of the image processing section 202.

In Step S16, the filter processing section 221 performs, for example, bilateral filter processing on the infrared image to remove noise while keeping the contours, and outputs the infrared image to the threshold determining section 222 and the distance image noise removing section 223.

In Step S17, as described with reference to FIG. 8, the threshold determining section 222 obtains a histogram from the pixel values of the respective pixels of the infrared image from which the noise has been removed. The threshold determining section 222 determines a threshold from a changing point, and outputs the threshold to the distance image noise removing section 223.

In Step S18, the distance image noise removing section 223 determines whether or not the pixel value of each pixel of the infrared image is smaller than the threshold obtained in the processing in Step S17. That is, the distance image noise removing section 223 determines whether or not the pixels indicate no infrared light reflection and can thus be regarded as no-detection pixels. Then, in a case where the distance image noise removing section 223 determines that the pixel can be regarded as a no-detection pixel, which indicates no infrared light reflection, the distance image noise removing section 223 sets the pixel value of a pixel at the corresponding position in the distance image to zero, that is, replaces the pixel by a no-detection pixel (black pixel) to set the pixel as the no-detection pixel, to thereby remove noise. In cases other than the above, the distance image noise removing section 223 employs pixel values corresponding to the distances of the distance image as they are.

In Step S19, the distance image noise removing section 223 outputs the distance image from which the noise has been removed.

Figure 7:
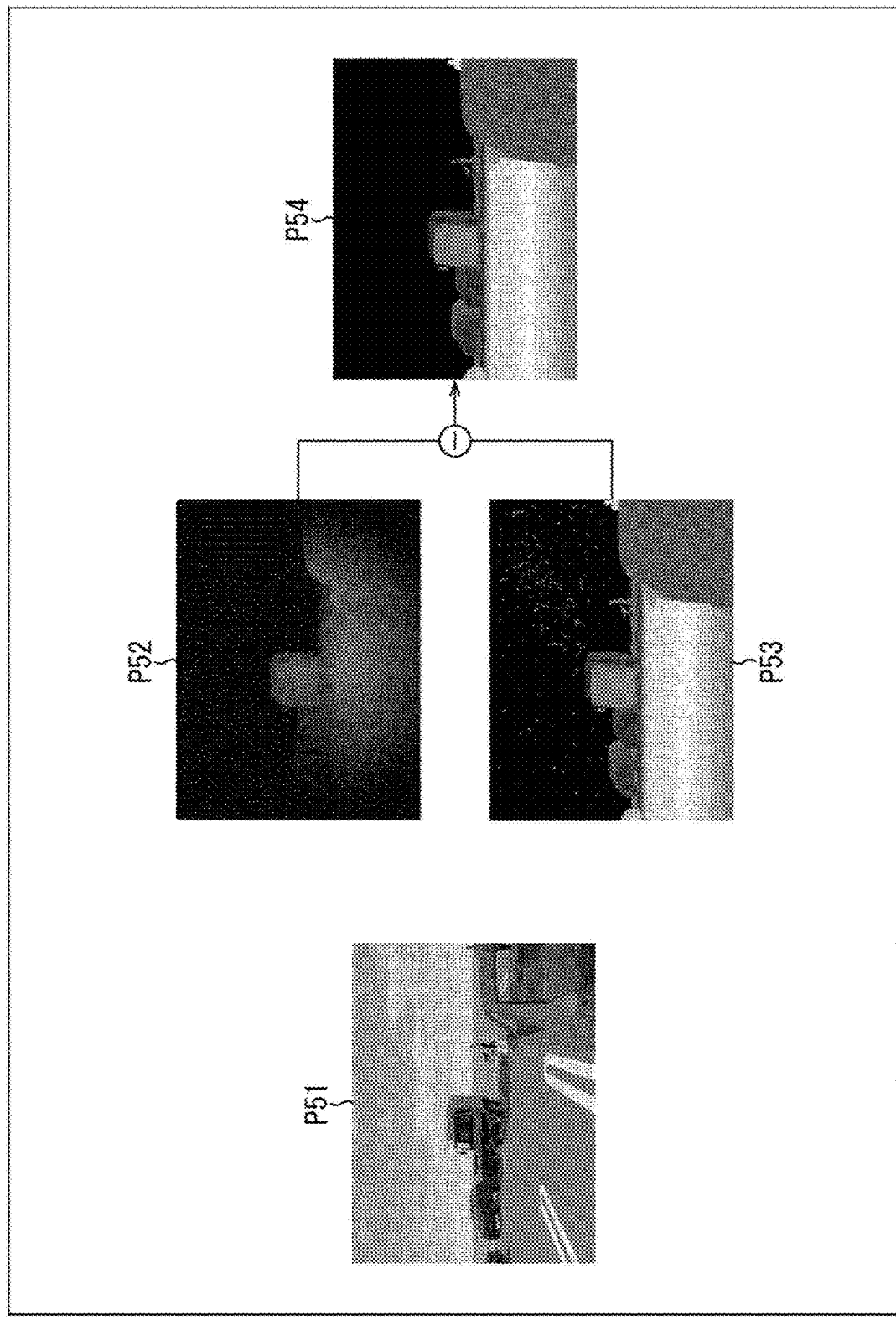
FIG. 7 is a diagram illustrating the distance image noise removing processing.

Through the series of processes described above, for example, from an imaging position and at an angle that are the same as those used in taking a monochrome image P51 illustrated in the left part of FIG. 7, an infrared image P52 in the upper central part of FIG. 7 and a distance image P53 in the lower central part of FIG. 7 are taken with the use of the ToF sensor 181.

Note that, the monochrome image P51 in the left part of FIG. 7 is the image of a parking space. The image includes a parked truck in the central portion and the sky as the background. Thus, as indicated by the infrared image P52 in the upper central part of FIG. 7, since there is no infrared light reflection from the sky region as the background, in the sky region, a pixel value of zero is set, that is, black pixels are set.

However, in the distance image P53 in the lower central part of FIG. 7, in the sky region as the background, regions indicating measured distances appear as noise spots due to diffusely reflected infrared light.

In such a case, through the series of processes described above, the pixel values of pixels in the distance image P53 that are present in regions corresponding to pixels having pixel values smaller than a predetermined threshold in the sky region in the infrared image P52 are set to no-detection pixels, that is, black pixels having no distance, namely, a pixel value of zero. With this, as indicated by a distance image P54 illustrated in the right part of FIG. 7, in the sky region, the black pixels are set, so that noise can be removed.

Note that, in the example described above, an infrared image and a distance image are generated, and the pixel values of pixels in the distance image that are present at positions corresponding to pixels having pixel values smaller than a predetermined threshold in the infrared image are set to no-detection pixels which are black pixels, so that noise is removed. It is only necessary, however, that pixels having a color close to black be used. For example, a pixel may be replaced with a pixel having a small pixel value having a color close to black as a predetermined pixel value.

Further, in the example described above, the data acquiring unit 102 includes the ToF sensor 181 to measure distance images and infrared images using infrared light. It is only necessary, however, that round-trip times with respect to objects be measured and received light intensities be obtained. For example, light other than infrared light may be projected to be received.

Moreover, instead of the ToF sensor, an infrared range-finding sensor (triangulation sensor) may be used. An infrared range-finding sensor emits infrared light through a lens and receives, on an imaging element, light reflected by objects through the lens. At this time, a light receiving position on the light receiving element differs depending on distances to objects. The infrared range-finding sensor observes such a position shift to measure distances to the objects on the basis of the principle of triangulation, to thereby generate a distance image. Further, the infrared range-finding sensor uses reflection intensities at this time to generate an infrared image.

Further, in a similar manner, instead of the ToF sensor, a structured light range-finding sensor may be used. A structured light range-finding sensor projects, on objects, for example, a voronoi pattern or a grid pattern which has a shape known in advance, and measures three-dimensional distances to the objects on the basis of the distortion of the pattern projected on the objects to generate a distance image. The structured light range-finding sensor generates an infrared image based on received infrared light similar to the ToF sensor 181 and other systems.

Moreover, in a similar manner, instead of the ToF sensor 181, a stereo camera sensor may be used. A stereo camera sensor includes two cameras. The stereo camera sensor detects the same object region from two camera images through image processing or the like, and calculates parallax to the object. The stereo camera sensor generates a distance image from this parallax by triangulation. Stereo camera sensors include active stereo camera sensors configured to emit infrared light and perform stereo processing on the reflected light, and passive stereo camera sensors configured to perform the stereo processing on the basis of images based on received visible light. The active stereo camera sensors can generate infrared images based on received infrared light. Further, the passive stereo camera sensors can use the luminance values of received light as infrared reflect intensities, thereby generating infrared images.

Further, in a similar manner, instead of the ToF sensor, LiDAR (Light Detection and Ranging, Laser Imaging Detection and Ranging) may be used. LiDAR is a sensor capable of emitting infrared light to obtain three-dimensional point clouds to obstacles around the sensor from the reflected light. A general ranging method is the ToF method. LiDAR can obtain the intensity of infrared light reflected by each three-dimensional point of a three-dimensional point cloud, and thus generate an infrared image. LiDAR is applicable to the present disclosure by using three-dimensional point clouds as distance images.

3. Application Example

In the example described above, the vehicle 11 is used as an example of the moving body, but the moving body may not be a vehicle and may be, for example, a mobile robot.

Figure 8:
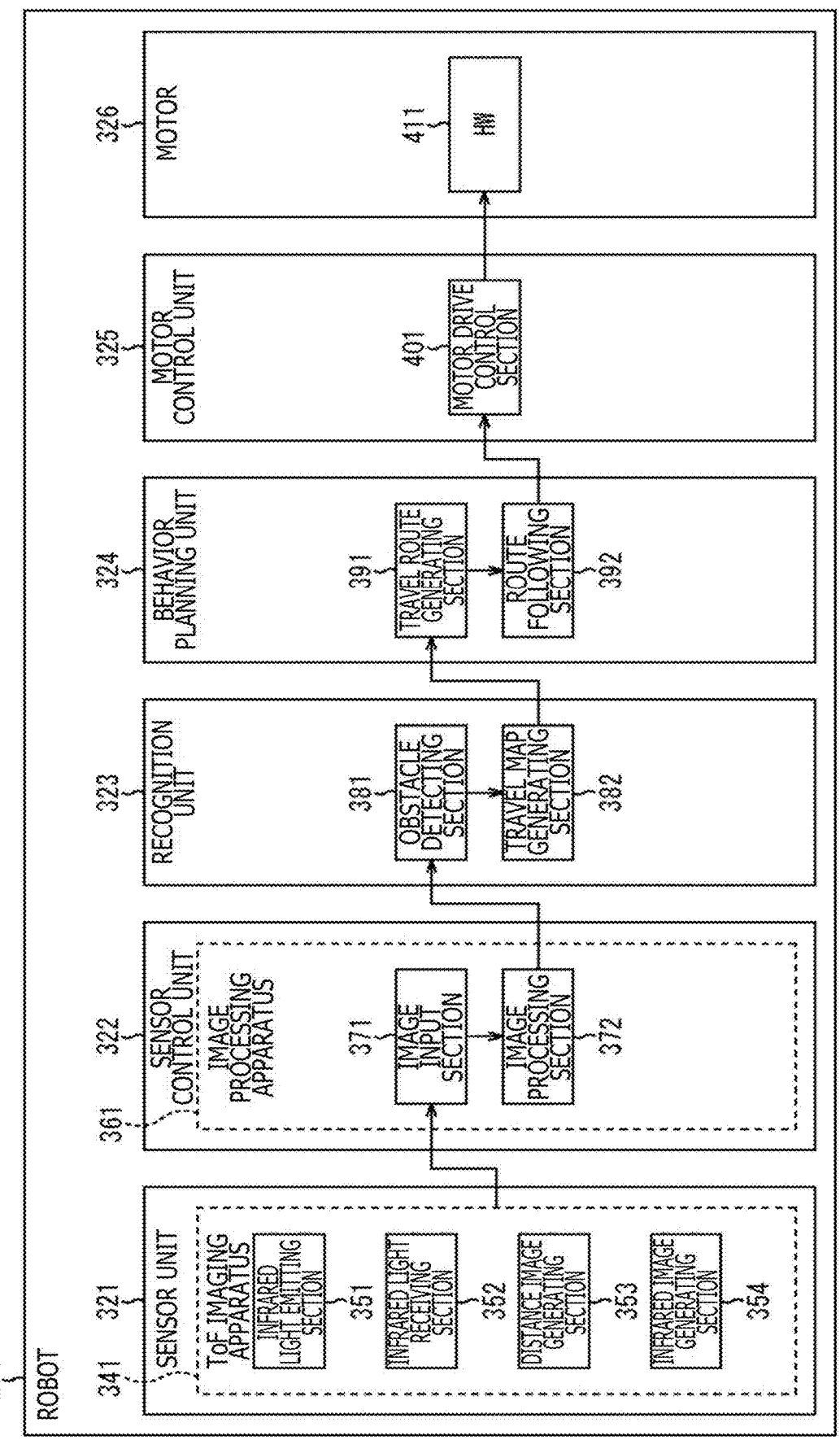
FIG. 8 is a block diagram illustrating a configuration example in a case where the technology of the present disclosure is applied to a robot.

FIG. 8 illustrates a module configuration example when the technology of the present disclosure is applied to an autonomous mobile robot. In this example, a system configured to detect obstacles using an ToF sensor and autonomously move to a destination.

In more detail, a robot 301 in FIG. 8 includes a sensor unit 321, a sensor control unit 322, a recognition unit 323, a behavior planning unit 324, a motor control unit 325, and a motor 326.

The sensor unit 321 includes a ToF imaging apparatus 341. The ToF imaging apparatus 341 includes an infrared light emitting section 351, an infrared light receiving section 352, a distance image generating section 353, and an infrared image generating section 354. Note that, the ToF imaging apparatus 341 has a configuration corresponding to the ToF sensor 181. The infrared light emitting section 351, the infrared light receiving section 352, the distance image generating section 353, and the infrared image generating section 354 correspond to the infrared light projecting section 191, the infrared light receiving section 192, the distance image generating section 193, and the infrared image generating section 194, respectively. Some components have similar functions, and the description thereof is omitted.

The sensor control unit 322 includes an image processing apparatus 361. The image processing apparatus 361 includes an image input section 371 and an image processing section 372. Note that, the image processing apparatus 361 corresponds to the outside-vehicle information detecting section 141 in FIG. 3. The image input section 371 and the image processing section 372 correspond to the image input section 201 and the image processing section 202, respectively. Some components have similar functions, and the description thereof is omitted.

The recognition unit 323 detects obstacles on the basis of a distance image from which noise has been removed and which is output from the sensor control unit 322. The recognition unit 323 generates a travel map on the basis of the detected obstacles, and outputs the travel map to the behavior planning unit 324.

In more detail, the recognition unit 323 includes an obstacle detecting section 381 and a travel map generating section 382. The obstacle detecting section 381 detects obstacles on the basis of a distance image, and outputs the obstacles to the travel map generating section 382. The travel map generating section 382 generates a travel map on the basis of information regarding obstacles detected by the obstacle detecting section 381, and outputs the travel map to the behavior planning unit 324.

The behavior planning unit 324 plans and generates a travel route on the basis of the travel map, and instructs the motor control unit 325 to control the robot to follow the generated travel route.

In more detail, the behavior planning unit 324 includes a travel route generating section 391 and a route following section 392. The travel route generating section 391 plans and generates a travel route on the basis of the travel map, and outputs the travel route information to the route following section 392. The route following section 392 generates, on the basis of travel route information, various commands for controlling the motor 326 so as to control the robot to move while following the travel route, and outputs the commands to the motor control unit 325.

The motor control unit 325 includes a motor drive control section 401. The motor drive control section 401 controls the drive of the motor 326 on the basis of commands for motor control.

The motor 326 includes various types of HW (Hardware) 411 for driving the motor 326. The motor control unit 325 controls the drive of the motor 326.

With such a configuration described above, the sensor unit 321 controls the ToF imaging apparatus 341 to take a distance image and an infrared image around the robot, and outputs the distance image and the infrared image to the sensor control unit 322.

The sensor control unit 322 controls the image processing apparatus 361 to remove noise from the distance image using the infrared image, and outputs the distance image from which the noise has been removed to the recognition unit 323.

The recognition unit 323 controls the obstacle detecting section 381 to detect obstacles on the basis of the distance image. Then, the recognition unit 323 controls the travel map generating section 382 to generate a travel map representing a region in which the robot 301 can move by itself, and to output the travel map to the behavior planning unit 324.

The behavior planning unit 324 controls the travel route generating section 391 to generate, using the travel map, a travel route to a determined destination. Then, the behavior planning unit 324 controls the route following section 392 to analyze the travel route in detail in consideration of, for example, the maneuverability of the body of the robot 301, and builds a route that the body of the robot 301 is actually followable, that is, a route on which the body of the robot 301 is actually movable. The behavior planning unit 324 outputs a command that allows the robot to move on the movable route to the motor control unit 325.

The motor control unit 325 controls the motor drive control section 401 to control the drive of the HW 411 of the motor 326 so that the robot 301 can move on the route that the body of the robot 301 is followable.

With such a configuration described above, the sensor unit 321 and the sensor control unit 322 corresponding to the data acquiring unit 102 and the outside-vehicle information detecting section 141 in FIG. 3, respectively, execute the distance image noise removing processing described with reference to the flowchart of FIG. 6. A distance image from which noise has been removed is therefore generated.

As a result, it is possible to reduce the risk of false detection that the recognition unit 323 detects an obstacle even though the obstacle does not actually exist in obstacle detection. It is therefore possible to prevent troubles that the robot cannot move in a region that is actually a movable region and that the robot suddenly stops on the basis of false detection due to noise.

4. Example of Execution by Software

Incidentally, the series of processes described above can be executed by hardware; however, the processing can also be executed by software. In a case where the series of processes is executed by software, a program configuring the software is installed from a recording medium to a computer incorporated in dedicated hardware, to, for example, a general-purpose computer capable of executing various functions with various programs installed thereon, or to other apparatuses.

Figure 9:
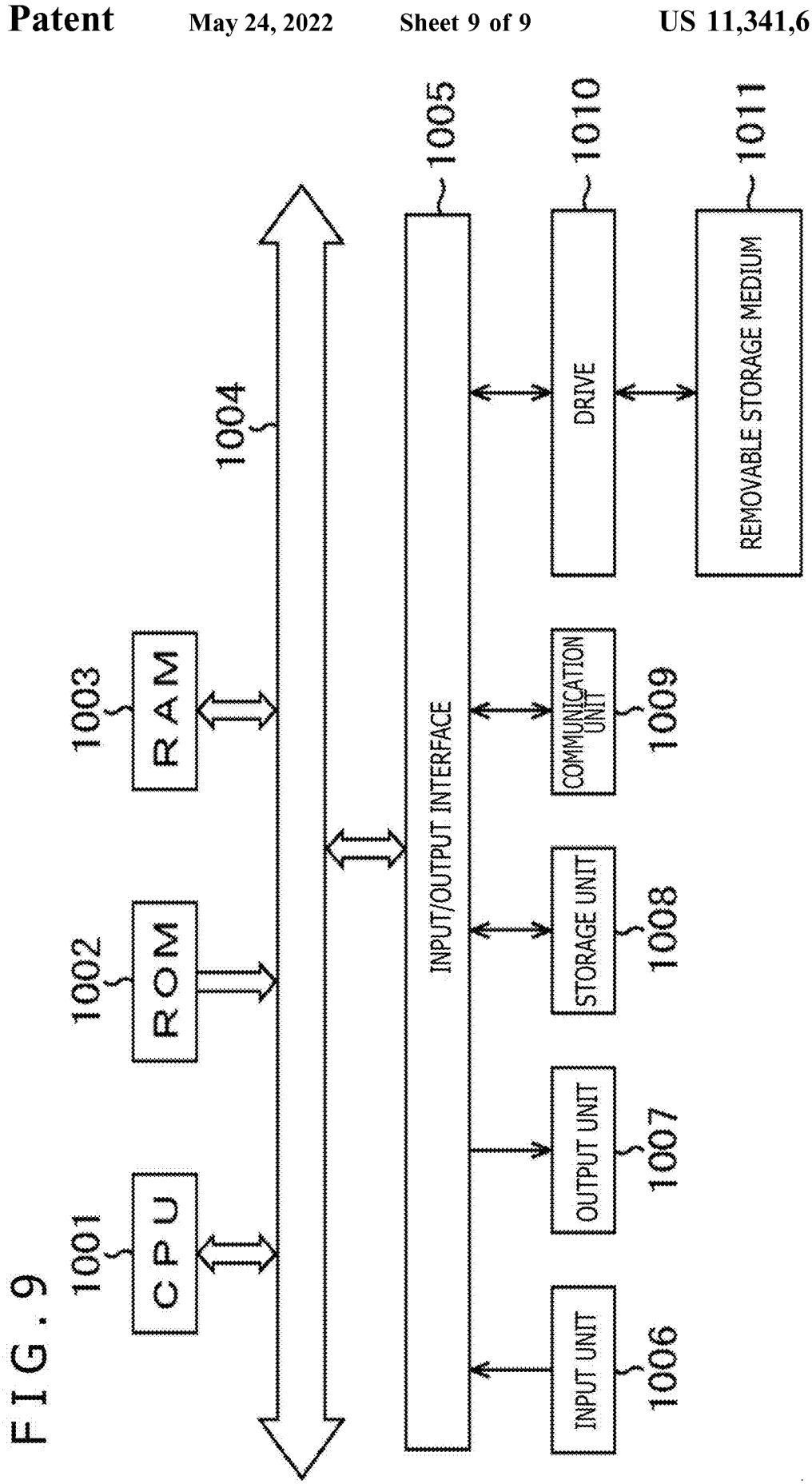
FIG. 9 is a diagram illustrating a configuration example of a general-purpose computer.

FIG. 9 illustrates a configuration example of the general-purpose computer. The computer incorporates a CPU (Central Processing Unit) 1001. The CPU 1001 is connected to an input/output interface 1005 through a bus 1004. The bus 1004 is connected to a ROM (Read Only Memory) 1002 and a RAM (Random Access Memory) 1003.

The input/output interface 1005 is connected to an input unit 1006 including input devices such as a keyboard and a mouse that allow a user to input operation commands, an output unit 1007 configured to output, to a display device, processing operation screens or processing result images, a storage unit 1008 including a hard disk drive and the like and configured to store programs and various data, and a communication unit 1009 including a LAN (Local Area Network) adapter and the like and configured to execute communication processing via a network typified by the Internet. Further, the input/output interface 1005 is connected to a drive 1010 configured to read or write data from or to a removable medium 1011 such as a magnetic disk (including flexible disk), an optical disc (including CD-ROM (Compact Disc-Read Only Memory) and DVD (Digital Versatile Disc)), a magneto-optical disk (including MD (Mini Disc)), or a semiconductor memory.

The CPU 1001 executes various types of processing on the basis of programs stored in the ROM 1002, or programs read from the removable medium 1011, such as the magnetic disk, the optical disc, the magneto-optical disk, or the semiconductor memory, to be installed on the storage unit 1008, and loaded to the RAM 1003 from the storage unit 1008. In the RAM 1003, for example, data necessary for the CPU 1001 to execute the various types of processing is also stored appropriately.

In the computer configured as described above, for example, the CPU 1001 loads a program stored in the storage unit 1008 to the RAM 1003 through the input/output interface 1005 and the bus 1004 to execute the series of processes described above.

The program that the computer (CPU 1001) executes can be provided by, for example, being recorded on the removable medium 1011 serving as a package medium or the like. Further, the program can be provided via a wired or wireless transmission medium such as a local area network, the Internet, or digital satellite broadcasting.

In the computer, the program can be installed on the storage unit 1008 through the input/output interface 1005 by mounting the removable medium 1011 on the drive 1010. Further, the program can be received by the communication unit 1009 via the wired or wireless transmission medium to be installed on the storage unit 1008. Besides, the program can be installed on the ROM 1002 or the storage unit 1008 in advance.

Note that, the program that the computer executes may include a program by which the processing is performed in time series along the order described herein, or may include a program by which the processes are performed in parallel or at necessary timing such as a timing when the program is called.

Note that, the CPU 1001 in FIG. 9 achieves the function of the self-driving control unit 112 in FIG. 2. Further, the storage unit 1008 in FIG. 9 achieves the storage unit 111 in FIG. 2.

Further, herein, a system means an aggregation of a plurality of components (apparatus, module (part) and the like), and it does not matter whether or not all of the components are in the same cabinet. Thus, a plurality of apparatuses accommodated in separate cabinets and connected to each other via a network, and one apparatus including a plurality of modules accommodated in one cabinet are both systems.

Note that, the embodiment of the present disclosure is not limited to the embodiment described above, and various modifications are possible without departing from the gist of the present disclosure.

For example, the present disclosure can employ the configuration of cloud computing that shares one function in a plurality of apparatuses via a network to process the function in cooperation.

Further, each step described in the above-mentioned flowchart can be executed by being shared in a plurality of apparatuses as well as being executed by one apparatus.

Moreover, in a case where a plurality of processes is included in one step, the plurality of processes included in the one step can be executed by being shared in a plurality of apparatuses as well as being executed by one apparatus.

Note that, the present disclosure can also take the following configurations.

<1>
An image processing apparatus, including:
a distance image acquiring section configured to acquire a distance image having a pixel value corresponding to a distance to an object imaged;
an intensity image acquiring section configured to acquire an intensity image having a pixel value corresponding to a received reflected light intensity of projected light from the object; and
a noise removing section configured to convert, into a predetermined pixel value, a pixel value of a pixel in the distance image that corresponds to a pixel having a pixel value smaller than a predetermined threshold in the intensity image, to thereby remove noise in the distance image.

<2>
The image processing apparatus according to <1>, further including:
a threshold determining section configured to generate a histogram of the pixel value of the intensity image, and determine a pixel value serving as a changing point in the histogram as the predetermined threshold.

<3>
The image processing apparatus according to <2>, further including:
a filter processing section configured to perform, on the intensity image, processing using a predetermined filter for removing noise.

<4>
The image processing apparatus according to <3>, in which the filter includes a bilateral filter.

<5>
The image processing apparatus according to any one of <1> to <4>,
in which the noise removing section converts the pixel value of the pixel in the distance image that corresponds to the pixel having the pixel value smaller than the predetermined threshold in the intensity image into a no-detection pixel indicating no detection of the distance, to thereby remove noise in the distance image.

<6>
The image processing apparatus according to any one of <1> to <5>, further including:
a light projecting section configured to project light;
a light receiving section configured to receive reflected light that includes light projected by the light projecting section and then reflected by the object;
a distance image generating section configured to obtain a distance to the object in pixel units based on time from when the light projecting section projects the light to when the light receiving section receives the reflected light, and to generate a distance image having a pixel value corresponding to the distance to the object; and
an intensity image generating section configured to generate an intensity image having a pixel value corresponding to an intensity of the reflected light that is received by the light receiving section in pixel units,
in which the distance image acquiring section acquires the distance image generated by the distance image generating section as the distance image having the pixel value corresponding to the distance to the object imaged, and
the intensity image acquiring section acquires the intensity image generated by the intensity image generating section as the intensity image having the pixel value corresponding to the received reflected light intensity of the projected light from the object.

<7>
The image processing apparatus according to <6>,
in which the light projecting section projects infrared light.
<8>
The image processing apparatus according to any one of <1> to <5>,
in which the distance image is generated by a triangulation infrared range-finding sensor.
<9>
The image processing apparatus according to any one of <1> to <5>,
in which the distance image is generated by a structured light range-finding sensor.
<10>
The image processing apparatus according to any one of <1> to <5>,
in which the distance image is generated by a stereo camera sensor.
<11>
The image processing apparatus according to any one of <1> to <5>,
in which the distance image is generated based on a three-dimensional point cloud that is measured by LiDAR (Light Detection and Ranging, Laser Imaging Detection and Ranging).
<12>
An image processing method, including:
distance image acquiring processing of acquiring a distance image having a pixel value corresponding to a distance to an object imaged;
intensity image acquiring processing of acquiring an intensity image having a pixel value corresponding to a received reflected light intensity of projected light from the object; and
noise removing processing of converting, into a predetermined pixel value, a pixel value of a pixel in the distance image that corresponds to a pixel having a pixel value smaller than a predetermined threshold in the intensity image.
<13>
A program for causing a computer to execute processing including:
a distance image acquiring section configured to acquire a distance image having a pixel value corresponding to a distance to an object imaged;
an intensity image acquiring section configured to acquire an intensity image having a pixel value corresponding to a received reflected light intensity of projected light from the object; and
a noise removing section configured to convert, into a predetermined pixel value, a pixel value of a pixel in the distance image that corresponds to a pixel having a pixel value smaller than a predetermined threshold in the intensity image.
<14>
A moving body, including:
a distance image acquiring section configured to acquire a distance image having a pixel value corresponding to a distance to an object imaged;
an intensity image acquiring section configured to acquire an intensity image having a pixel value corresponding to a received reflected light intensity of projected light from the object;
a noise removing section configured to convert, into a predetermined pixel value, a pixel value of a pixel in the distance image that corresponds to a pixel having a pixel value smaller than a predetermined threshold in the intensity image;
a situation analyzing section configured to generate an environmental map based on the distance image from which the noise has been removed;
a planning section configured to plan a travel route based on the environmental map generated by the situation analyzing section; and
an operation control section configured to control operation based on the travel route planned by the planning section.

REFERENCE SIGNS LIST

11 Vehicle, 141 Outside-vehicle information detecting section, 181 ToF sensor, 191 Infrared light projecting section, 192 Infrared light receiving section, 193 Distance image generating section, 194 Infrared image generating section, 201 Image input section, 202 Image processing section, 211 Infrared image input section, 212 Distance image input section, 221 Filter processing section, 222 Threshold determining section, 223 Distance image noise removing section, 301 Robot, 321 Sensor unit, 322 Sensor control unit, 323 Recognition unit, 324 Behavior planning unit, 325 Motor control unit, 326 Motor, 341 ToF imaging unit, 351 Infrared light emitting section, 352 Infrared light receiving section, 353 Distance image generating section, 354 Infrared image generating section, 361 Image processing apparatus, 371 Image input section, 372 Image processing section, 381 Obstacle detecting section, 382 Travel map generating section, 391 Travel route generating section, 392 Route following section, 401 Motor drive control section, 411 HW (Hardware)

The invention claimed is:

1. An image processing apparatus, comprising:
a processor configured to:
    acquire a distance image having a plurality of first pixel values, wherein
        each of the plurality of first pixel values corresponds to a distance to an object imaged, and
        a pixel of the distance image has a first pixel value of the plurality of first pixel values;
    acquire an intensity image having a plurality of second pixel values,
        wherein each of the plurality of second pixel values corresponds to a received reflected light intensity of projected light from the object;
    execute, based on a specific filter, a filtering process on the intensity image to generate a filtered intensity image,
        wherein the execution of the filtering process on the intensity image is for removal of a first noise from the intensity image; and
    convert, into a specific pixel value, the first pixel value of the pixel of the distance image, wherein
        the pixel of the distance image corresponds to a pixel of the filtered intensity image, and
        the pixel of the filtered intensity image has a second pixel value of the plurality of second pixel values smaller than a specific threshold.

2. The image processing apparatus according to claim 1, wherein the processor is further configured to:
    generate a histogram of the plurality of second pixel values of the filtered intensity image; and
    determine a third pixel value serving as a changing point in the generated histogram, as the specific threshold.

3. The image processing apparatus according to claim 1, wherein the specific filter includes a bilateral filter.

4. The image processing apparatus according to claim 1, wherein
the processor is further configured to convert the first pixel value of the pixel of the distance image into the specific pixel value of a no-detection pixel;
the no-detection pixel indicates no detection of the distance,
the specific pixel value of the no-detection pixel is equal to zero, and
the conversion of the first pixel value of the pixel of the distance image is for removal of a second noise in the distance image.

5. The image processing apparatus according to claim 1, further comprising a sensor configured to:
project light;
receive reflected light that includes the light projected and then reflected by the object;
obtain the distance to the object in pixel units based on a time from the projection of the light to the reception of the reflected light;
generate the distance image based on the obtained distance to the object; and
generate the intensity image having the plurality of second pixel values, wherein
each of the plurality of second pixel values corresponds to an intensity of the reflected light, and
the processor is further configured to:
acquire the generated distance image from the sensor, and
acquire the generated intensity image from the sensor.

6. The image processing apparatus according to claim 5, wherein the sensor is further configured to project infrared light.

7. The image processing apparatus according to claim 1, further comprising a triangulation infrared range-finding sensor configured to generate.

8. The image processing apparatus according to claim 1, further comprising a structured light range-finding sensor configured to generate the distance image.

9. The image processing apparatus according to claim 1, further comprising a stereo camera sensor configured to generate the distance image.

10. The image processing apparatus according to claim 1, wherein the processor is further configured to generate the distance image based on a three-dimensional point cloud measured by LiDAR (Light Detection and Ranging, Laser Imaging Detection and Ranging).

11. An image processing method, comprising:
acquiring a distance image having a plurality of first pixel values, wherein
each of the plurality of first pixel values corresponds to a distance to an object imaged, and
a pixel of the distance image has a first pixel value of the plurality of first pixel values;
acquiring an intensity image having a plurality of second pixel values,
wherein each of the plurality of second pixel values corresponds to a received reflected light intensity of projected light from the object;
executing, based on a specific filter, a filtering process on the intensity image to generate a filtered intensity image,
wherein the execution of the filtering process on the intensity image is for removal of a noise from the intensity image; and
converting, into a specific pixel value, the first pixel value of the pixel of the distance image, wherein
the pixel of the distance image corresponds to a pixel of the filtered intensity image, and
the pixel of the filtered intensity image has a second pixel value of the plurality of second pixel values smaller than a specific threshold.

12. A non-transitory computer-readable medium having stored thereon computer-executable instructions that, when executed by a processor, cause the processor to execute operations, the operations comprising:
acquiring a distance image having a plurality of first pixel values, wherein
each of the plurality of first pixel values corresponds to a distance to an object imaged, and
a pixel of the distance image has a first pixel value of the plurality of first pixel values;
acquiring an intensity image having a plurality of second pixel values,
wherein each of the plurality of second pixel values corresponds to a received reflected light intensity of projected light from the object;
executing, based on a specific filter, a filtering process on the intensity image to generate a filtered intensity image,
wherein the execution of the filtering process on the intensity image is for removal a noise from the intensity image; and
converting, into a specific pixel value, the first pixel value of the pixel of the distance image, wherein
the pixel of the distance image corresponds to a pixel of the filtered intensity image, and
the pixel of the filtered intensity image has a second pixel value of the plurality of second pixel values smaller than a specific threshold.

13. A moving body, comprising:
a processor configured to:
acquire a distance image having a plurality of first pixel values, wherein
each of the plurality of first pixel values corresponds to a distance to an object imaged, and
a pixel of the distance image has a first pixel value of the plurality of first pixel values;
acquire an intensity image having a plurality of second pixel values,
wherein each of the plurality of second pixel values corresponds to a received reflected light intensity of projected light from the object;
execute, based on a specific filter, a filtering process on the intensity image to generate a filtered intensity image,
wherein the execution of the filtering process on the intensity image is for removal of a first noise from the intensity image;
convert, into a specific pixel value, the first pixel value of the pixel of the distance image, wherein
the pixel of the distance image corresponds to a pixel of the filtered intensity image,
the pixel of the filtered intensity image has a second pixel value of the plurality of second pixel values smaller than a specific threshold, and the conversion of the first pixel value of the pixel of the distance image is for removal of a second noise from the distance image;
generate an environmental map based on the distance image from which the second noise has been removed;
plan a travel route based on the environmental map; and
control a specific operation based on the travel route.

* * * * *